May 6, 1958
L. MARES
2,833,266
PORTABLE FISHING GUNS FOR THROWING FISHING
SPEAR BY MEANS OF COMPRESSED GAS
Filed May 27, 1954
3 Sheets-Sheet 1
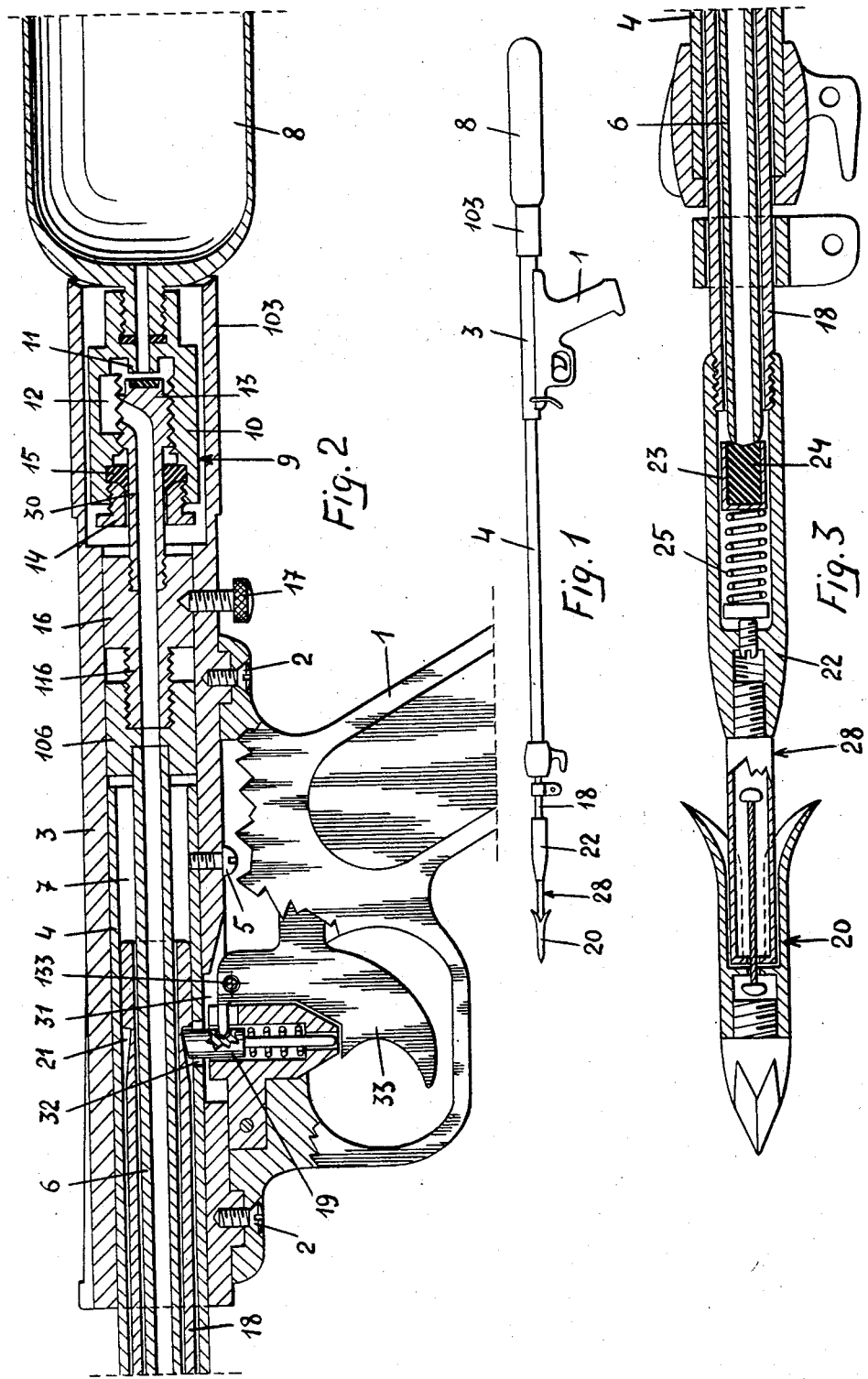

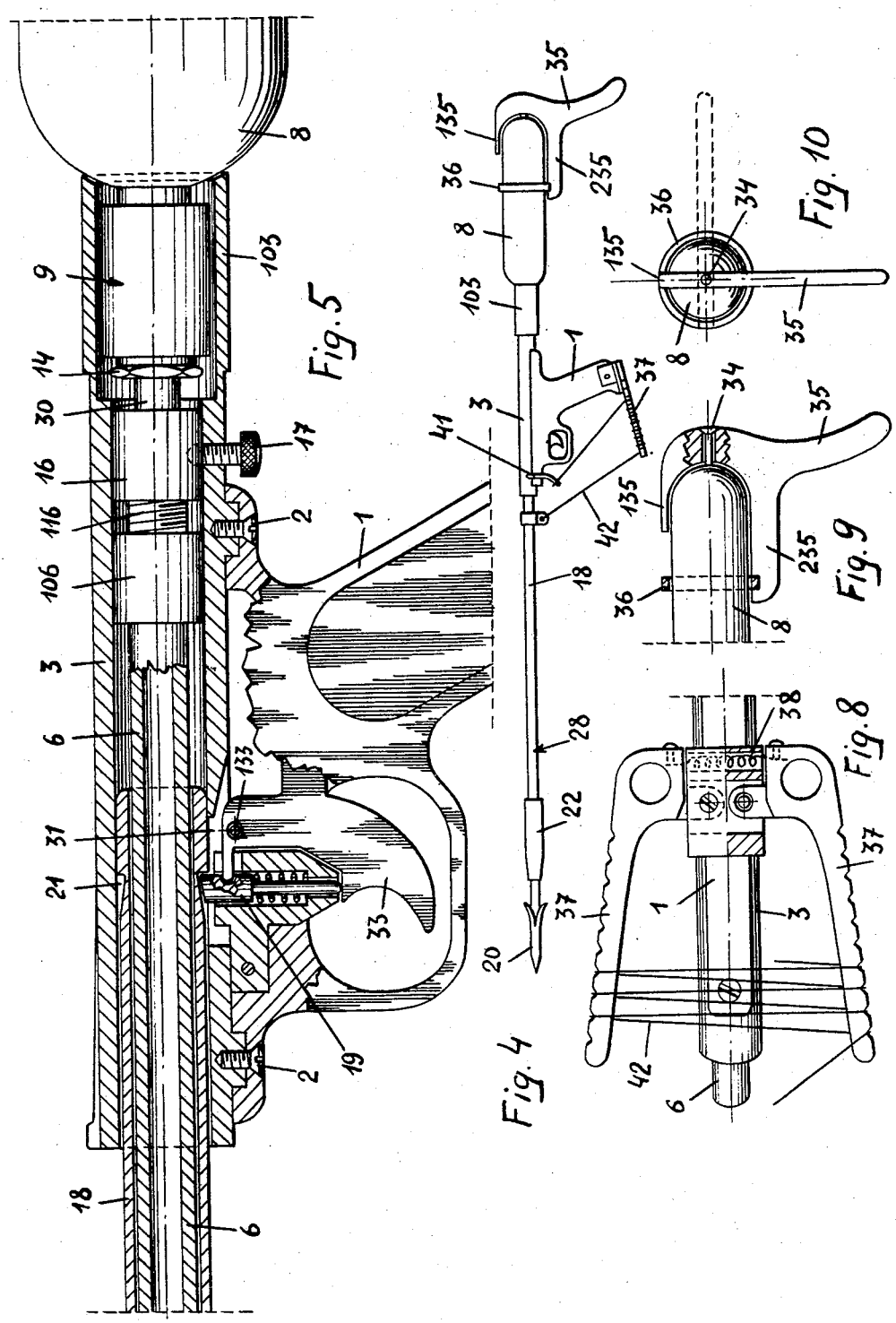

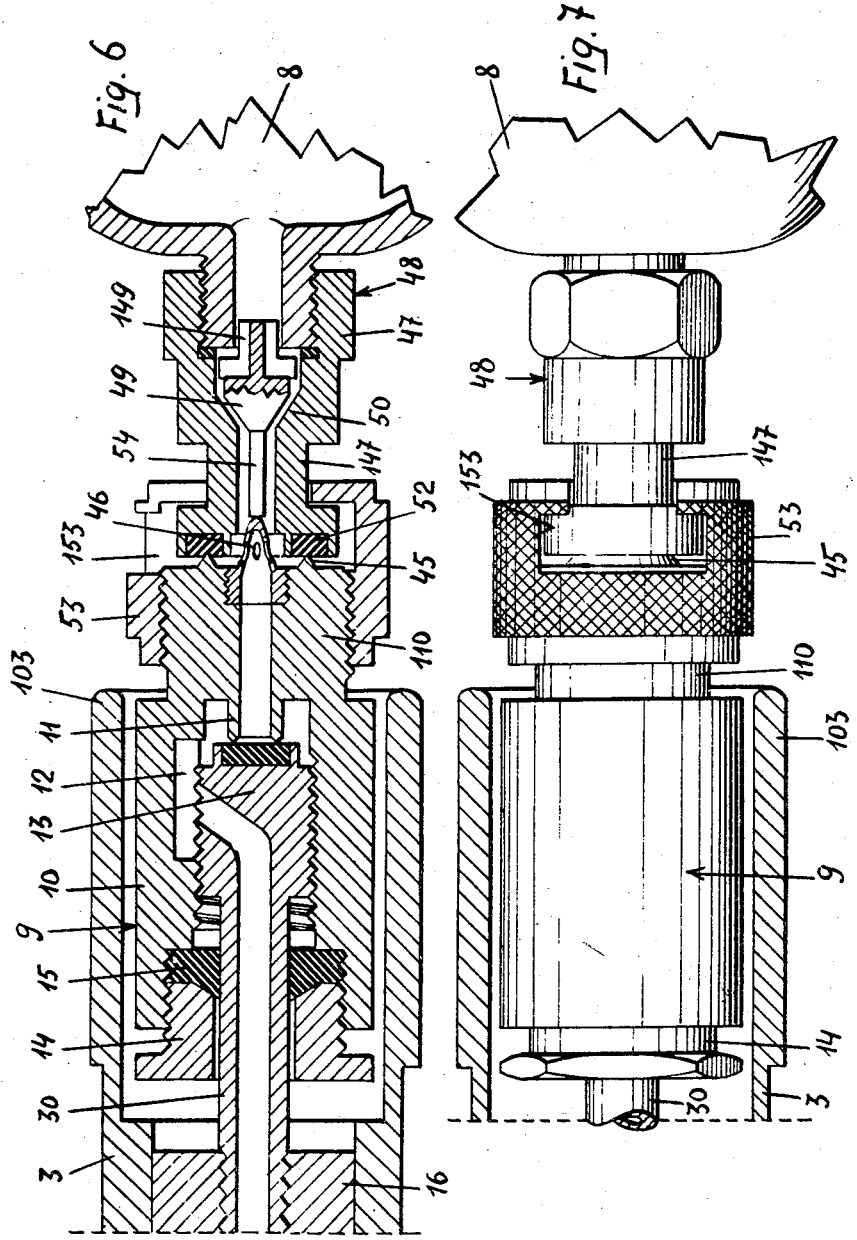

United States Patent Office 2,833,266
Patented May 6, 1958

2,833,266

PORTABLE FISHING GUNS FOR THROWING FISHING SPEAR BY MEANS OF COMPRESSED GAS

Lodovico Mares, Rapallo, Italy

Application May 27, 1954, Serial No. 432,845

Claims priority, application Italy June 6, 1953

6 Claims. (Cl. 124—11)

This invention relates to portable fishing guns particularly adapted for subaqueous fishing and aims to provide a fishing gun which throws a fishing spear by means of a compressed gas (usually carbon dioxide) contained in a small portable steel bottle fitted to the gun.

One of the objects of the invention is to provide a fishing gun of the kind above referred to by means of which it is possible to repeatedly shoot fishing spears with great force without practically requiring considerable force for reloading the gun.

Another object of the invention is to provide a fishing gun of the kind above referred to employing the fishing spears as valve means for holding the compressed gas charge which serves for throwing or shooting the spear, in a tube serving as a chamber for the propelling gas charge and as a guide for the spear.

Other objects and advantages of the invention will be apparent from the following specification.

With reference to the attached drawings, in which like parts are indicated by the same reference numerals:

Figure 1 shows a side view of a first embodiment of fishing gun.

Figures 2 and 3 show in section and at a larger scale the grip end and the muzzle end of the gun, respectively.

Figure 4 is a view of another embodiment of gun.

Figure 5 is an enlarged section through the grip end of the embodiment of gun shown in Figure 4.

Figures 6 and 7 are respectively an enlarged section and side view of the breech end of the gun, showing another embodiment of the attachment and valve means of the gun breech to the gas bottle.

Figure 8 is a bottom view of a particular reel for the spear line, fitted to the gun grip; and Figures 9 and 10 show a side view and a rear view of a rotatable butt adapted to be fitted to the rear end of the compressed gas bottle.

With reference to the embodiment shown in Figures 1 through 3 of the drawing, to a preferably pistol-like grip 1, a sleeve 3 is fastened as by screws 2. To sleeve 3 a barrel 4 is fastened as by screw 5. Within the sleeve 3 and barrel 4 there is fastened, by means of a rear block 106 having an axial bore which is partially threaded at its rear end, a tube 6 which is rigidly fastened to said rear block 106 and projecting for a short length beyond the muzzle of barrel 4 leaving between its exterior and the interior of barrel 4 a cylindrical gap 7 into which may be slidably fitted the tubular rod 18 of a particular spear 28 employed with this gun and which will be described later on.

Within the threaded part of the hole of rear block 106 the threaded hub 116 of a connecting block 16 is screwed, which is provided at its rear end with a screw-threaded bore in which the threaded end of the cylindrical neck portion 30 of a valve head 13 is fitted. The neck portion 30 is axially bored in line with the bores of blocks 16, 106 and of tube 6 but in proximity of valve head 13 this bore is blind and connected to a substantially radial branch opening by the side of said valve head 13. Both connecting block 16 and valve member 30—13 form in practice a single piece which is fastened to sleeve 3 as by screw 17.

Valve head 13 is screw-threaded and is screwed into valve housing 10 which is provided with a valve chamber 12 which extends from valve seat 11 formed integral with housing 10 towards a side of said housing, where the bore of valve head 13 opens. On the cylindrical neck 30 of said valve head 13 an outwardly screw-threaded packing gland 14 is fitted which is screwed into a corresponding threaded part of valve housing 10, where it compresses a packing 15. Valve housing 10 is tightly fitted on the neck of a small gas bottle 8. All said valve members, including housing 10, valve head 13 and neck 30 are loosely housed within the counterbored rear end of sleeve 3 and will be referred to as the "gun valve" 9.

With the construction thus described it is apparent that by screwing or unscrewing valve housing 10 on its valve head 13 (which is easily done by turning the gas bottle 8) valve seat 11 is axially shifted towards or away from valve head 13 thus intercepting or establishing the communication between the gas bottle 8 and the bore of tube 6.

With reference to Figure 3, as said, the muzzle end of tube 6 extends beyond barrel 4. On the other hand the tubular rod 18 of the fishing spear 28 is closed at its end with a cap-like member 22 in which a cylindrical shell 23 filled with packing 24 is slidably mounted and urged rearwardly towards the end of the spear rod 18, by a spring 25. To said cap-like member 22 the usual spear head 20, which may be of any conventional construction, is attached as by screwing.

The tubular spear rod 18 is provided at its rear end with an annular notch 21 (Fig. 2) into which may snap a spring bolt 19 (which may be of any conventional construction) which may be withdrawn by means of a trigger 33 hinged at 133 by the gun grip 1. The bolt 19 passes through corresponding apertures 31 and 32 of sleeve 3 and barrel 4, respectively.

The operation of the above-described fishing gun is apparent:

With the valve housing 10 fully screwed on valve head 13 the communication between gas bottle 8 and tube 6 is intercepted. By inserting spear rod 18 into the gap 7 between barrel 4 and tube 6, when the notch 21 of the spear rod comes in correspondence with spring bolt 19, this will snap into the notch 21, thus holding the spear fast. At the same time the packing 24 in the cap 22 on the spear rod will be spring-pressed against the muzzle of tube 6, thus tightly sealing the same. Now, by holding the gun grip 1 with one hand and the gas bottle 8 with the other hand, by slightly unscrewing and again screwing the valve housing 10 (which is easily done, by slightly turning bottle 8), the gun valve 9 will be opened and a charge of highly compressed gas will be transferred from the bottle into the tube 6 which is sealed at its muzzle end by spring-pressed packing 24. By turning bottle 8 in the reversed direction, valve 9 will be again closed. When it is desired to throw spear 28, it is sufficient to pull trigger 33, and the spear being no longer retained by bolt 19, will be shot with great force by the charge of compressed gas within tube 6 and will be guided at the beginning of its throw by both barrel 4 and tube 6. The operation may be repeated for numerous times, while the gas in the bottle 8 is under a sufficient pressure.

When the pressure of the gas in the bottle 8 is insufficient, the bottle may be easily refilled by closing the valve 9, unscrewing screw 17 and then threaded hub 16 from block 106 and then by screwing the same hub into a corresponding threaded bore fitted to the usual pressure reducer attached to a conventional large steel bottle containing gas (usually carbon dioxyde) under high pressure, and closing the same valve after the bottle 8 has been filled, after which the bottle 8 with attached valve may be again dismounted from the large gas bottle and fitted to the gun.

In order to permit of constructing lighter fishing guns having larger propelling gas charges, the construction shown in Figures 4 and 5 may be adopted. According to this embodiment, the tube 6 is made of greater diameter than in the case shown in Figures 1 to 3 and the barrel 4 of the former embodiment is omitted, so that tube 6 projects by almost its full length from sleeve 3, leaving a short gap in which the tail end of the spear rod 18 may be inserted. In this case the spear rod is guided substantially only by tube 6.

Figures 6 and 7 show an improved construction of refilling valve (which is indicated in its whole by the reference numeral 48) for permitting the refilling of the bottle 8 without dismounting the gun valve 9.

According to this embodiment, the gun valve housing 10 is provided at its rear end with an externally threaded hub 110 whose bore has at its rear end a short inner screw thread in which a bushing provided with a hollow apertured projection 46 may be fitted. Hub 110 is provided at its rear end with an annular bottom rib 45 co-acting with an annular gasket 52 provided on the front end of a valve housing 47 screwed on the neck of the gas bottle 8. Within the valve housing 47 a slidable valve member 49 is mounted, having a preferably conical head co-acting with a like seat 50 of valve housing 47. In the embodiment as shown, the valve 49 as a longitudinally grooved tail guide portion 149, slidably mounted within the bore of the gas bottle neck, and a front pin 54 slidable with some play within a corresponding bore of valve housing 47 and of such a length as to abut against projection 46. The valve housing 47 has at its front portion a neck 147 of reduced diameter on which a cap nut 53 provided with a radial slot 153 may be fitted. This cap nut may be screwed on to the outer thread of hub 110, thus connecting the refilling valve 48 to the gun valve 9. When these parts are connected, the refilling valve 48 is held open by the co-action of projection 46 with pin 54. When however nut 53 is loosened, the gas under pressure contained in the botle 8 blows valve 49 against its seat and thus prevents the escaping of gas.

When the bottle is to be refilled, the same high pressure of the gas contained in the large steel bottle is sufficient to shift the valve 49 open, but on the pressure reducer of the large bottle it is possible to provide a projecting abutment member, like the projection 46, so as to speed up the bottle refilling.

In order to render more easy the charging and shooting operations with the improved fishing gun, it may be provided with a rotatable butt, in the manner as shown in Figures 4, 9 and 10. The butt is, as shown in the said figures, in the form of a crutch 35 provided with spaced supporting fingers 135, 235 one of which, 235 carries a ring 36 which may be snugly fitted on the cylindrical body of bottle 8. The butt has in its crutch-like part a bore for attaching same to the rear end of the gas bottle 8 which is provided with a projecting rivet 34. As it is apparent (see also dash-line position in Figure 10) the butt is angularly shiftable, thus permitting of easily adjusting the gun for shooting.

It may be mentioned also that the improved gun construction thus described permits the adopting of a simplified reel arrangement for anchoring the spear-holding line. This is particularly shown in Figures 4 and 8: The reel is in the form of a pair of hinged notched arms 37 urged away from each other by spring means 38 and attached to the bottom end of the pistol grip 1 of the gun. The line 42 is spirally coiled as shown in Figure 10 and may be easily uncoiled by pulling same from the front end, where it is attached to the spear rod, while the rear line end is anchored to a fixed part 41 of the gun. It is apparent that when the coiled line is pulled from the spear end, it will be easily uncoiled from the reel on which it is coiled, as the arms of the reel will easily yield under the pull.

From the foregoing it is apparent that the improved compressed-gas fishing gun just described provides a very efficient light fishing implement, which may shoot by a simple operation a number of times a fishing spear having a very powerful stabbing power and thus may be adopted for stabbing even large animals.

Of course the invention may undergo numerous changes though remaining within the limits of the invention. Thus, although, in view of the very high propelling gas pressure (which may be as high as about 50 atmospheres or 700 p. s. f.) a screw gun valve of the kind described is preferred, in case of guns for smaller fishes, in which a much lower gas pressure is sufficient, the valve may be of the slidable type, controlled either by a suitable lever, or even by means of the same trigger holding the spear rod, whereby said trigger may first open the gun valve and then leave unbolted the spear rod.

I claim:

1. A portable fishing gun comprising a tube, means for rigidly connecting said tube to a light compressed gas bottle, a valve in said connecting means for intercepting or establishing the communication between the interior of the bottle and the tube, a grip attached to the rear end of said tube, a spear having a tubular rod snugly slidable on said tube, a notch in the rear end of said spear rod, a spear head-carrying cap member fastened to the front end of said rod, spring-urged packing means in said cap member, a spring bolt in said grip projecting beyond the attachment of the grip into the path of the spear rod end when the same is slid onto the said tube and means for retracting said bolt, said tube being of such a length as to cooperate with said packing contained in the said cap to seat the muzzle end of said tube when the notch in said rear end of said spear rod is engaged by said bolt and the spear is thus held fast on the fishing gun tube.

2. A portable fishing gun for throwing a spear by means of compressed gas comprising a sleeve-like member provided with a radial opening therethrough, a grip attached to said sleeve-like member under said opening and carrying a trigger, and a spring lock operatively connected to said trigger in such a manner as to project through said radial opening of said sleeve-like member into its inner bore when the trigger is in an idle position and to be retracted by pressing on the said trigger; a tube provided at its rear end with a rear block fastened into said sleeve-like member in a position rearwardly of said sleeve-like member opening; a connecting block fitted at the rear end of said rear block, valve means fitted to said connecting block; means for fastening the rear end of said sleeve-like member to a portable compressed gas bottle provided with valve means operable from the rear gun end and adapted to co-act with said valve means carried by said block, and a spear having a tubular rod-like portion adapted to be slidably fitted on said tube and provided at its rear end with an annular notch adapted to be engaged by said trigger-operated lock and ending at its spear-carrying end in a cap-like member containing a spring-urged packing member which, when the spear rod-like portion notch is engaged by the said lock, tightly seals the muzzle of said tube.

3. A fishing gun according to claim 2, in which coaxially of said tube, a second tube, acting as gun barrel, is fitted from the muzzle end of which only a small portion of the first said or inner tube projects, whereby between the inner tube and the outer tube or barrel a gap exists which permits of inserting said tubular spear rod-like portion.

4. A fishing gun according to claim 1 in which the said valve intercepting or establishing the communication between the gas bottle and the gun tube on which the said tubular spear rod may be slid comprises a valve member fastened to the gas bottle and a co-acting valve member fastened to the said gun tube, said valve members being screwed the one into the other, and constituting the gun valve, whereby by turning the said gas bottle and gun tube with respect to one another the said gun valve is opened or closed.

5. A portable fishing gun comprising a tubular member provided with a radial opening, a tube provided with a rear block fastened to said tubular member and projecting forwardly beyond said tubular member, whereby between the front part of the tubular member interior and a part of said tube which is forwardly of said tube block an annular gap exists; a grip attached to said tubular member under said opening of said tubular member and carrying a trigger, a spring lock operatively connected to said trigger in such a manner as to project, when the trigger is not depressed, into the gap between said tubular member and said tube; a small compressed gas bottle provided with an automatic valve for permitting the refilling of said bottle which closes under the pressure of the gas in the gas bottle and having a front aperture for having access to the interior of the valve and opening said valve against the pressure of the gas in the bottle; a gun valve comprising two valve parts screwed the one into the other fitted to said bored rear block to which the said gun tube is attached; a projecting member fitted to the rear end of said gun valve; means for rigidly but dismountably connecting said gun valve with said automatic valve in such a manner that, when the members are connected together, the projecting member of the said gun valve projects into the said automatic valve and keeps the same open, and a spear having a tubular rod adapted to be slidably fitted on said tube and, in part, into the gap between said tube and said tubular member and provided at its rear end with an annular notch in such a position as to be engaged by said trigger-operated lock when the spear rod is completely slid onto said tube and provided at its front end with a spear head-carrying cap-like member containing a spring-urged packing member which, when the spear rod notch is engaged by said lock, tightly seals the muzzle of said tube.

6. A fishing gun according to claim 4, in which a butt is rotatably attached to the rear end of said gas bottle by means of a rivet projecting from said rear bottle end.

References Cited in the file of this patent

UNITED STATES PATENTS

| 433,674 | Darcy | Aug. 5, 1890 |
| 2,660,993 | Blakeslee | Dec. 1, 1953 |

FOREIGN PATENTS

| 924,613 | France | Apr. 11, 1947 |